(12) United States Patent
Chen et al.

(10) Patent No.: US 10,506,879 B1
(45) Date of Patent: Dec. 17, 2019

(54) SLIDE RAIL ASSEMBLY

(71) Applicants: KING SLIDE WORKS CO., LTD., Kaohsiung (TW); KING SLIDE TECHNOLOGY CO., LTD., Kaohsiung (TW)

(72) Inventors: Ken-Ching Chen, Kaohsiung (TW); Hsiu-Chiang Liang, Kaohsiung (TW); Chun-Chiang Wang, Kaohsiung (TW)

(73) Assignees: KING SLIDE WORKS CO., LTD., Kaohsiung (TW); KING SLIDE TECHNOLOGY CO., LTD., Kaohsiung (TW)

( * ) Notice: Subject to any disclaimer, the term of this patent is extended or adjusted under 35 U.S.C. 154(b) by 0 days.

(21) Appl. No.: 16/503,600

(22) Filed: Jul. 4, 2019

(30) Foreign Application Priority Data

Apr. 23, 2019 (TW) .............................. 108114400 A

(51) Int. Cl.
*A47B 88/493* (2017.01)
*F16H 19/04* (2006.01)
*A47B 88/437* (2017.01)

(52) U.S. Cl.
CPC .......... *A47B 88/493* (2017.01); *A47B 88/437* (2017.01); *F16H 19/04* (2013.01); *A47B 2210/007* (2013.01)

(58) Field of Classification Search
CPC ............ A47B 88/493; A47B 2210/007; A47B 2210/0013; A47B 2210/0075; A47B 2210/0048; A47B 2210/0059; A47B 2210/0032; A47B 2210/0037; A47B 2210/0078; A47B 2210/0035; A47B 2210/004; A47B 2210/0067; A47B 88/437; A47B 88/487; A47B 2210/0056; A47B 10/0064; A47B 10/0072; A47B 10/0081; F16H 19/04; F16C 2314/72; F16C 29/005; F16C 29/04; F16C 33/306; F16C 29/045
See application file for complete search history.

(56) References Cited

U.S. PATENT DOCUMENTS

| | | | | |
|---|---|---|---|---|
| 1,758,550 | A * | 5/1930 | Wolters ................ | A47B 88/493 312/331 |
| 3,857,618 | A * | 12/1974 | Hagen ..................... | F16C 29/04 384/18 |
| 4,320,934 | A * | 3/1982 | Rock ..................... | A47B 88/493 312/331 |
| 4,351,575 | A * | 9/1982 | Rock ..................... | A47B 88/493 312/334.12 |
| 9,784,314 | B2 * | 10/2017 | Ng ......................... | F16C 29/005 |
| 9,993,077 | B2 | 6/2018 | Chen | |
| 2004/0104649 | A1 * | 6/2004 | Muller ................ | A47B 88/467 312/333 |
| 2004/0145284 | A1 * | 7/2004 | Egger ..................... | E05F 5/02 312/331 |

(Continued)

*Primary Examiner* — Hiwot E Tefera
(74) *Attorney, Agent, or Firm* — Winston Hsu

(57) ABSTRACT

A slide rail assembly includes a first rail, a second rail and a third rail. The second rail is movably mounted between the first rail and the third rail. The slide rail assembly further includes a sliding auxiliary device and a gear. The sliding auxiliary device is arranged between the second rail and the third rail. The gear is arranged in the sliding auxiliary device and configured to mesh between the second rail and the third rail.

10 Claims, 8 Drawing Sheets

(56) References Cited

U.S. PATENT DOCUMENTS

| | | | | |
|---|---|---|---|---|
| 2012/0125035 | A1* | 5/2012 | Chellappan | F25D 25/025 |
| | | | | 62/340 |
| 2012/0248956 | A1* | 10/2012 | Netzer | A47B 88/487 |
| | | | | 312/334.9 |
| 2013/0002115 | A1* | 1/2013 | Friesenecker | A47B 88/493 |
| | | | | 312/334.8 |
| 2013/0127319 | A1* | 5/2013 | Breisacher | A47B 88/493 |
| | | | | 312/334.23 |
| 2013/0127320 | A1* | 5/2013 | Greussing | A47B 88/443 |
| | | | | 312/334.44 |
| 2014/0241651 | A1* | 8/2014 | Greussing | A47B 88/487 |
| | | | | 384/19 |
| 2016/0324318 | A1* | 11/2016 | Langguth | A47B 88/493 |
| 2017/0184151 | A1* | 6/2017 | Huang | F16C 29/008 |

\* cited by examiner

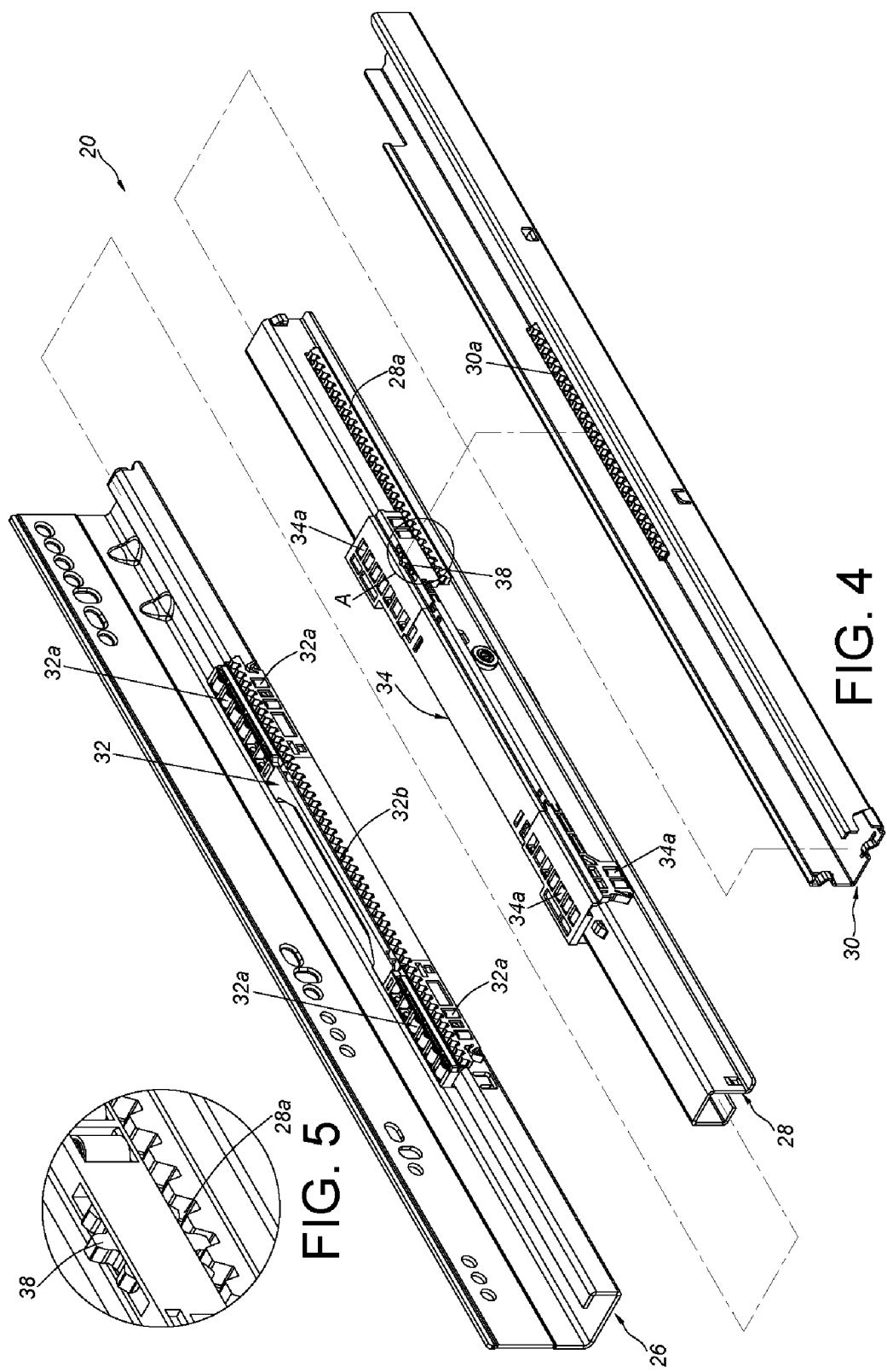

SLIDE RAIL ASSEMBLY

BACKGROUND OF THE INVENTION

1. Field of the Invention

The present invention relates to a slide rail assembly, and more particularly, to a slide rail assembly having improved reliability.

2. Description of the Prior Art

U.S. patent with U.S. Pat. No. 9,993,077 B2 discloses a slide rail assembly and a sliding auxiliary device thereof. Wherein, a first sliding auxiliary device and a second sliding auxiliary device of the patent are consisted by a plurality of parts engaged with each other. The length of the auxiliary devices can be adjusted for corresponding to length of different slide rails. Furthermore, the patent also discloses a synchronizing member meshes between a first meshing feature of the first sliding auxiliary device and a second meshing feature of the second sliding auxiliary device, such that the first sliding auxiliary device and the second sliding auxiliary device are able to be moved synchronously to further improve reliability of movement of the second rail and the third rail when the second rail and the third rail are moved relative to the first rail.

However, for different requirements of market, how to develop a different related product to create more options in the market has become an issue.

SUMMARY OF THE INVENTION

The present invention relates to a slide rail assembly having improved reliability.

According to an aspect of the present invention, a slide rail assembly includes a first rail, a second rail, a third rail, a first sliding auxiliary device, a second sliding auxiliary device, a first gear and a second gear. The second rail is movable relative to the first rail. The second rail has a first function member. The third rail is movable relative to the second rail. The third rail has a second function member. The first sliding auxiliary device is arranged between the first rail and the second rail. The first sliding auxiliary device has a first function portion. The second sliding auxiliary device is arranged between the second rail and the third rail. The second sliding auxiliary device has a second function portion. The first gear is arranged on the second rail. Wherein, the first gear is configured to mesh between the first function portion of the first sliding auxiliary device and the second function portion of the second sliding auxiliary. The second gear is arranged on the second sliding auxiliary device. Wherein, the second gear is configured to mesh between the first function member of the second rail and the second function member of the third rail. Wherein, the first gear is rotatable relative to the second rail through a shaft, and the second gear is rotatable relative to the second sliding auxiliary device through another shaft.

Preferably, the first sliding auxiliary device includes a plurality of rolling members.

Preferably, the plurality of rolling members of the first sliding auxiliary device are rollers or balls.

Preferably, the second sliding auxiliary device includes a plurality of rolling members.

Preferably, the plurality of rolling members of the second sliding auxiliary device are rollers or balls.

Preferably, the first function portion of the first sliding auxiliary device and the second function portion of the second sliding auxiliary device are racks.

Preferably, the first function member of the second rail and the second function member of the third rail are racks.

Preferably, the slide rail assembly is applicable to a furniture assembly including a first furniture member and a second furniture member. Wherein, the first rail is connected to the first furniture member and the third rail is configured to carry the second furniture member.

Preferably, the first furniture member is a cabinet body and the second furniture member is a drawer.

Preferably, the first gear accommodates in a first space of the second rail, and the second gear accommodates in a second space of the second sliding auxiliary device.

According to another aspect of the present invention, a slide rail assembly includes a first rail, a second rail and a third rail. The second rail is movably mounted between the first rail and the third rail. The slide rail assembly further includes a sliding auxiliary device and a gear. The sliding auxiliary device is arranged between the second rail and the third rail. The gear is arranged in the sliding auxiliary device. The gear is configured to mesh between a first function member of the second rail and a second function member of the third rail.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is an exploded view illustrating the slide rail assembly according to the embodiment of the present invention.

FIG. 5 is an enlarged view of an area A of FIG. 4.

DETAILED DESCRIPTION

Figure 1:
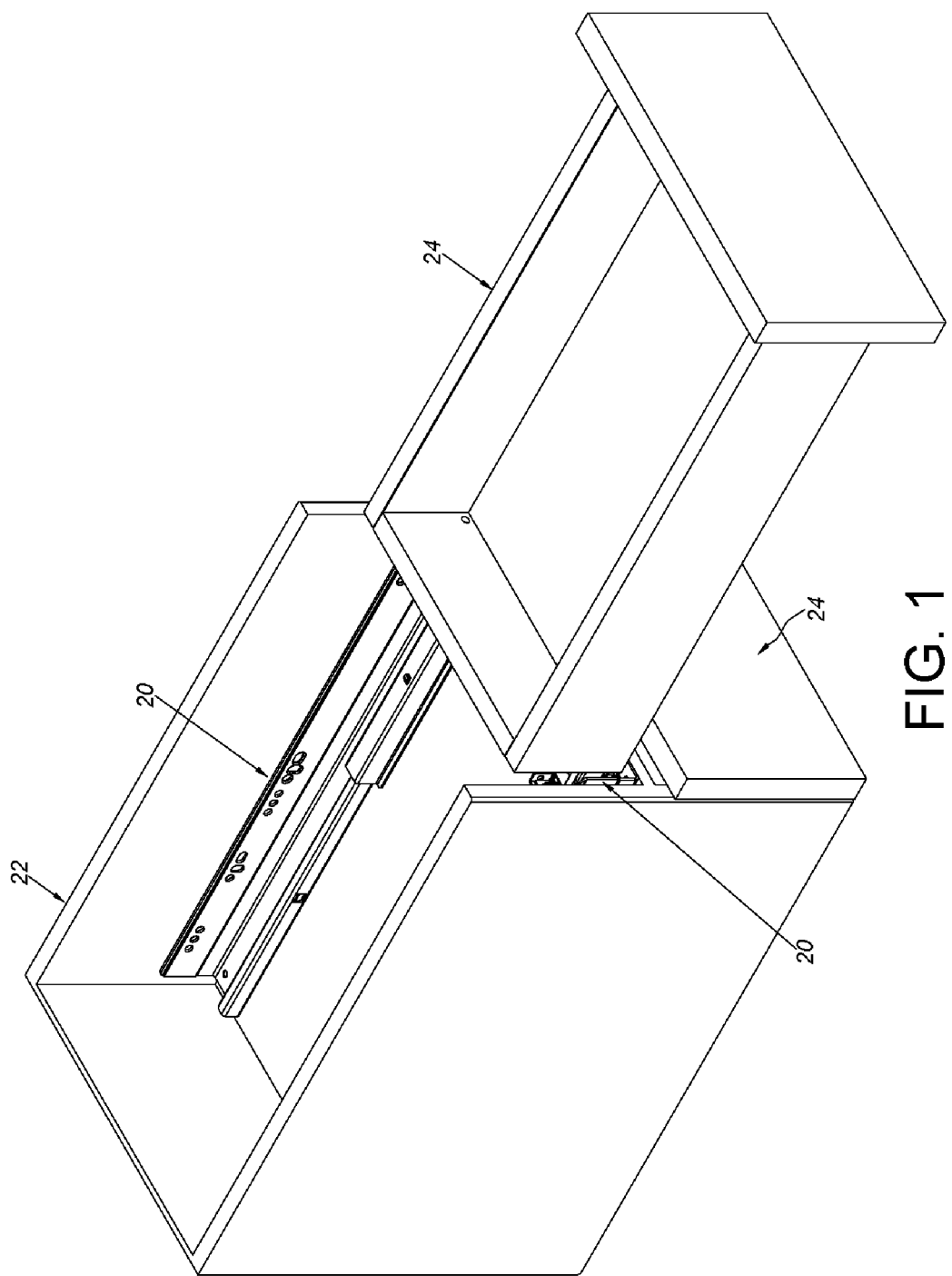
FIG. 1 is a schematic diagram illustrating a slide rail assembly applied to a furniture assembly according to an embodiment of the present invention.

As shown in FIG. 1, a slide rail assembly 20 according to an embodiment of the present invention is applicable to a furniture assembly. The furniture assembly includes a first furniture member 22 and at least one second furniture member 24. In the present embodiment, the first furniture member 22 is a cabinet body and the at least one second furniture member 24 are a plurality of drawers, but the present invention is not limited thereto. The slide rail assembly 20 is mounted between the first furniture member 22 and each of the at least one second furniture member 24. Wherein, the slide rail assembly 20 is an undermount drawer slide. Two slide rail assemblies 20 correspond to each of the at least one second furniture member 24 and are respectively mounted adjacent to two sides of bottom of each of the second furniture member 24. As such, each of the at least one second furniture member 24 is able to be easily pulled out from or pushed into the first furniture member 22 to be retracted through the two slide rail assemblies 20.

Figure 2:
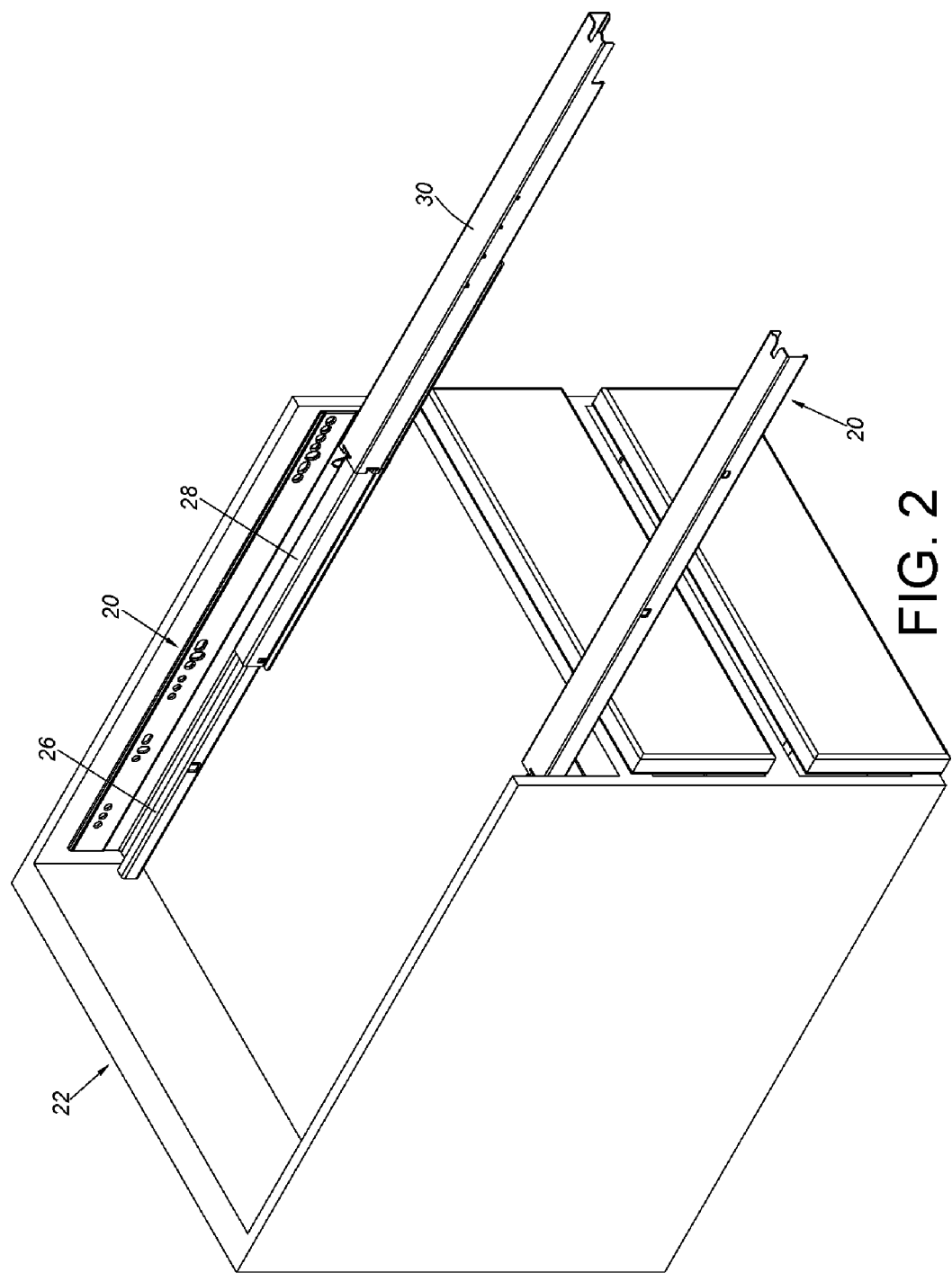
FIG. 2 is a diagram illustrating the slide rail assembly applied to the furniture assembly and being in an extended state according to the embodiment of the present invention.

As shown in FIG. 2, each of the slide rail assembly 20 includes a first rail 26, a second rail 28 and a third rail 30. The second rail 28 is movably mounted between the first rail 26 and the third rail 30, and configured to extend a traveling distance of the third rail 30 relative to the first rail 26. Wherein, the first rail 26 is connected to the first furniture member 22. In the present embodiment, the first rail 26 is fixedly connected to the first furniture member 22 by screwing, but the present invention is not limited thereto. The second rail 28 is able to be moved along a longitudinal direction (of the first rail 26) relative to the first rail 26 and located at an extend position. The third rail 30 is able to be moved along the longitudinal direction relative to the second rail 28 and located at an extend position, and the third rail 30 is configured to carry the at least one second furniture member 24. According to FIG. 2, the slide rail assembly 20 in FIG. 2 is in an extended state.

Figure 3:
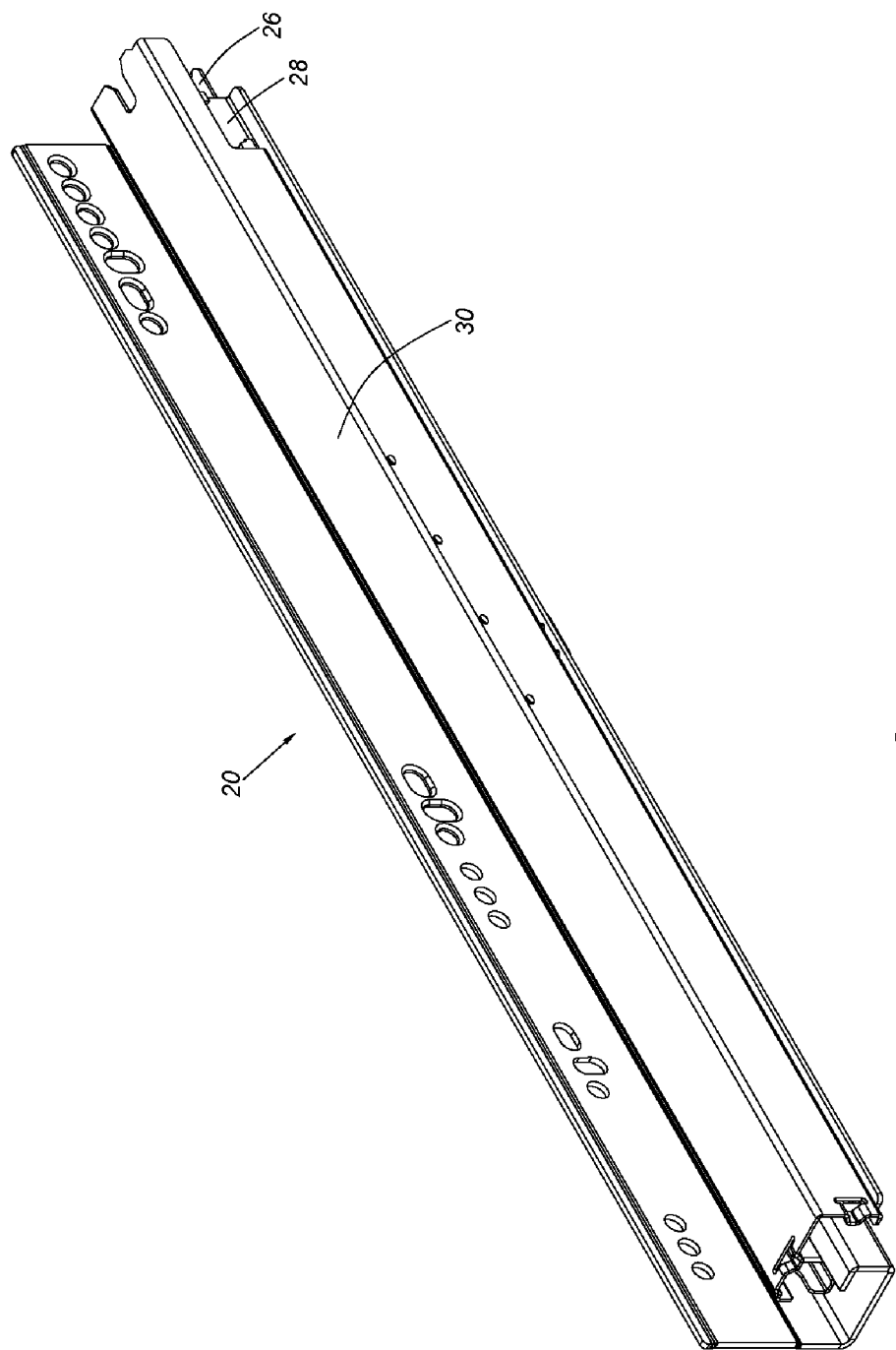
FIG. 3 is a diagram illustrating the slide rail assembly being in a retracted state according to the embodiment of the present invention.

AS shown in FIG. 3, the slide rail assembly 20 in FIG. 3 is in a retracted state. Specifically, the second rail 28 is retracted relative to the first rail 26 and the third rail 30 is retracted relative to the second rail 28.

Figure 6:
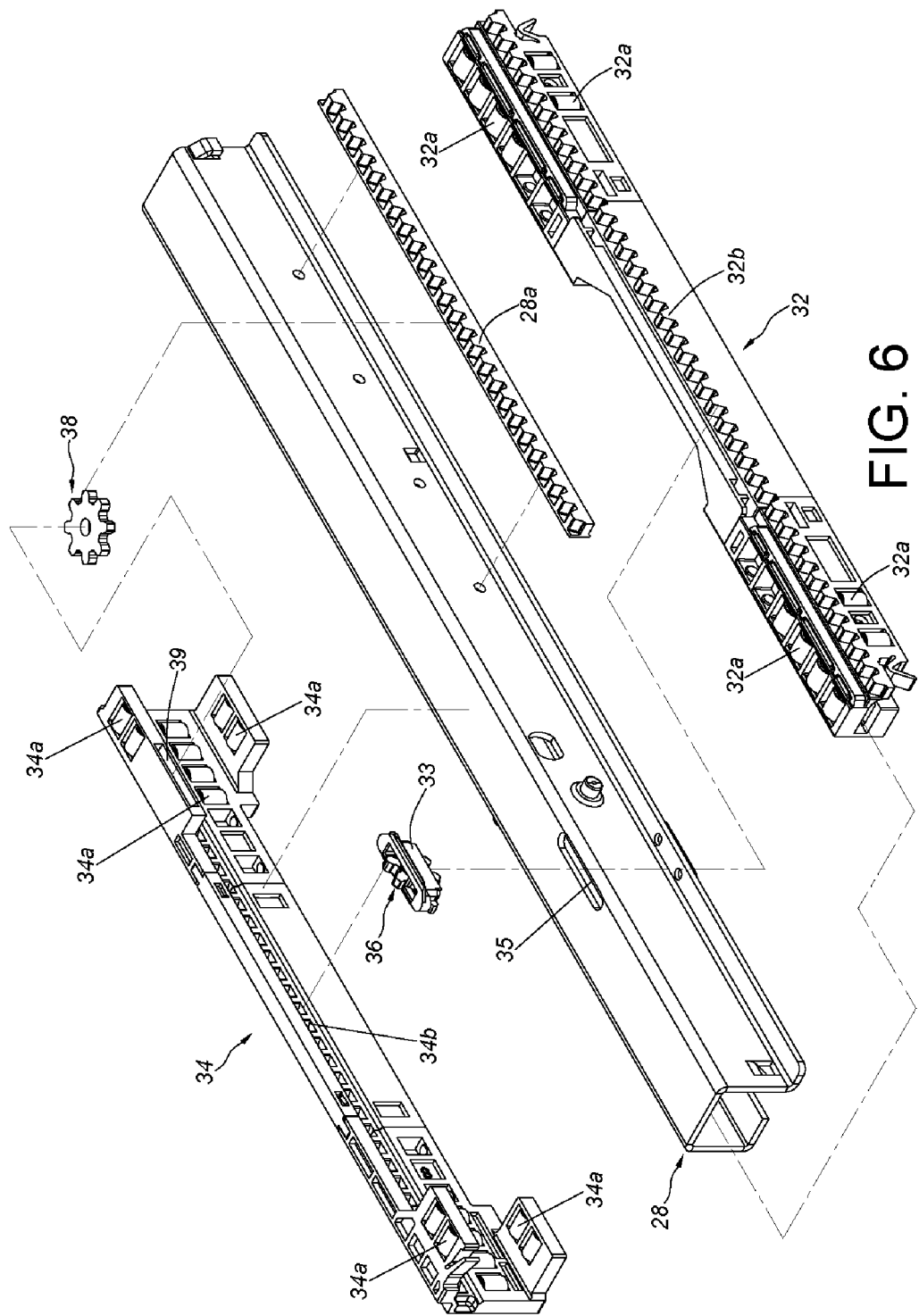
FIG. 6 is an exploded view illustrating a slide rail, a first sliding auxiliary device, a second sliding auxiliary device, a first gear, a second gear and related components of the slide rail assembly according to the embodiment of the present invention.

As shown in FIG. 4, FIG. 5 and FIG. 6, the slide rail assembly 20 further includes a first sliding auxiliary device 32 and a second sliding auxiliary device 34. Specifically, the first sliding auxiliary device 32 is arranged between the first rail 26 and the second rail 28, and configured to facilitate the smoothness between the first rail 26 and the second rail 28 when the second rail 28 is moved relative to the first rail 26. On the other hand, the second sliding auxiliary device 34 is arranged between the second rail 28 and the third rail 30, and configured to facilitate the smoothness between the second rail 28 and the third rail 30 when the third rail 30 is moved relative to the second rail 28.

Preferably, the first sliding auxiliary device 32 includes a plurality of first rolling members 32a. The plurality of first rolling members 32a of the first sliding auxiliary device 32 are rollers or balls. On the other hand, the second sliding auxiliary device 34 includes a plurality of second rolling members 34a. The plurality of second rolling members 34a of the second sliding auxiliary device 34 are rollers or balls.

Preferably, the first sliding auxiliary device 32 and the second sliding auxiliary device 34 respectively have a longitudinal length. Wherein, a first function portion 32b is arranged on the first sliding auxiliary device 32, and a second function portion 34b is arranged on the second sliding auxiliary device 34 (as shown in FIG. 6). In the present embodiment, the first function portion 32b is fixedly arranged on the first sliding auxiliary device 32, and the second function portion 34b is fixedly arranged on the second sliding auxiliary device 34.

Moreover, the slide rail assembly 20 further includes a first gear 36 (as shown in FIG. 6). The first gear 36 is arranged in the second rail 28. The first gear 36 is configured to mesh between the first function portion 32b of the first sliding auxiliary device 32 and the second function portion 34b of the second sliding auxiliary device 34. In the present embodiment, the first gear 36 is rotatably connected in a mounting base 33, and the mounting base 33 accommodates in a first space 35 of the second rail 28, but the present invention is not limited thereto. For example, the mounting base 33 of the present invention can be omitted, and the first gear 36 is pivoted to the second rail 28 by a shaft. As such, the first gear 36 is rotatable relative to the second rail 28. Preferably, the first function portion 32b of the first sliding auxiliary device 32 and the second function portion 34b of the second sliding auxiliary device 34 are racks arranged along the longitudinal direction.

Furthermore, a first function member 28a is arranged on the second rail 28, and a second function member 30a is arranged on the third rail 30 (as shown in FIG. 4). Preferably, the first function member 28a of the second rail 28 and the second function member 30a of the third rail 30 are racks arranged along the longitudinal direction. In the present embodiment, the first function member 28a is fixedly arranged on the second rail 28 and can be regarded as a portion of the second rail 28. The second function member 30a is fixedly arranged on the third rail 30 and can be regarded as a portion of the third rail 30. Moreover, the slide rail assembly 20 further includes a second gear 38 arranged in the second sliding auxiliary device 34. The second gear 38 is configured to mesh between the first function member 28a of the second rail 28 and the second function member 30a of the third rail 30. In the present embodiment, the second gear 38 is rotatably connected to the second sliding auxiliary device 34 and accommodates in a second space 39 of the second sliding auxiliary device 34 (as shown in FIG. 6). For example, the second gear 38 can be pivoted to the second sliding auxiliary device 34 by a shaft. As such, the second gear 38 is rotatable relative to the second sliding auxiliary device 34.

Figure 7:
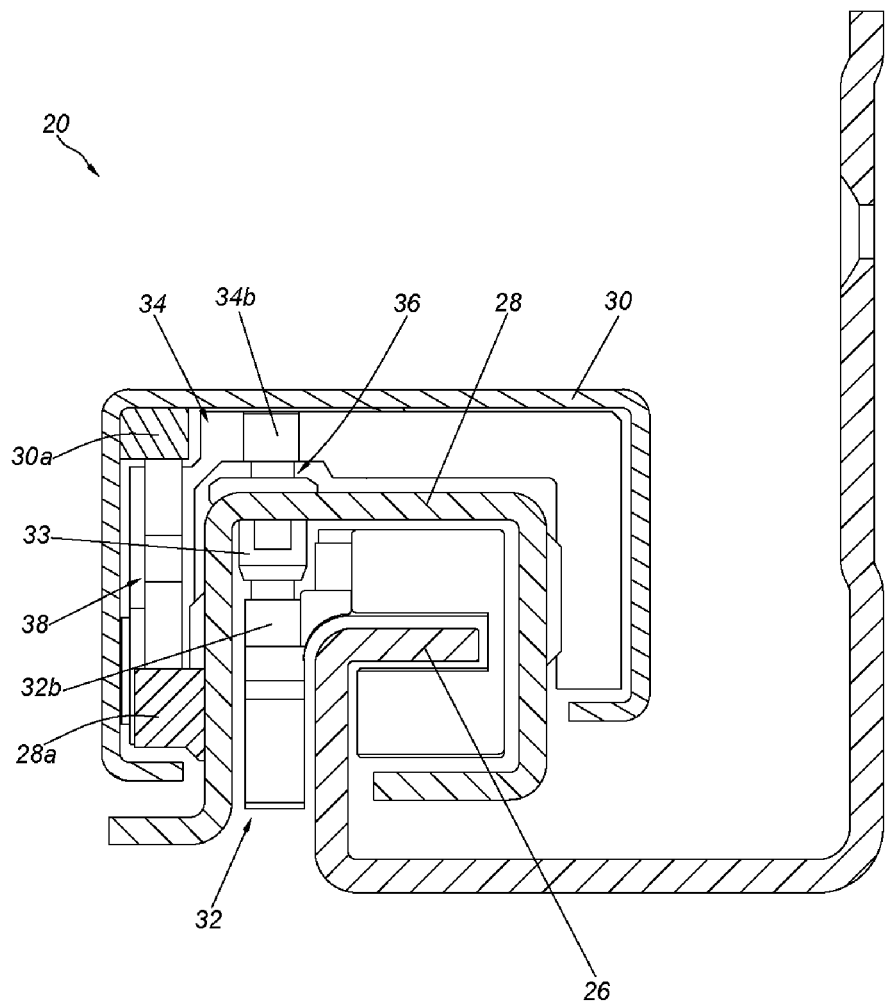
FIG. 7 is a cross-sectional view illustrating the slide rail assembly according to the embodiment of the present invention.

As shown in FIG. 7, the slide rail assembly 20 includes the first rail 26, the second rail 28, the third rail 30, the first sliding auxiliary device 32 and the second sliding auxiliary device 34. Wherein, the first gear 36 of the second rail 28 meshes between the first function portion 32b of the first sliding auxiliary device 32 and the second function portion 34b of the second sliding auxiliary device 34. On the other hand, the second gear 38 of the second sliding auxiliary device 34 meshes between the first function member 28a of the second rail 28 and the second function member 30a of the third rail 30.

Figure 8:
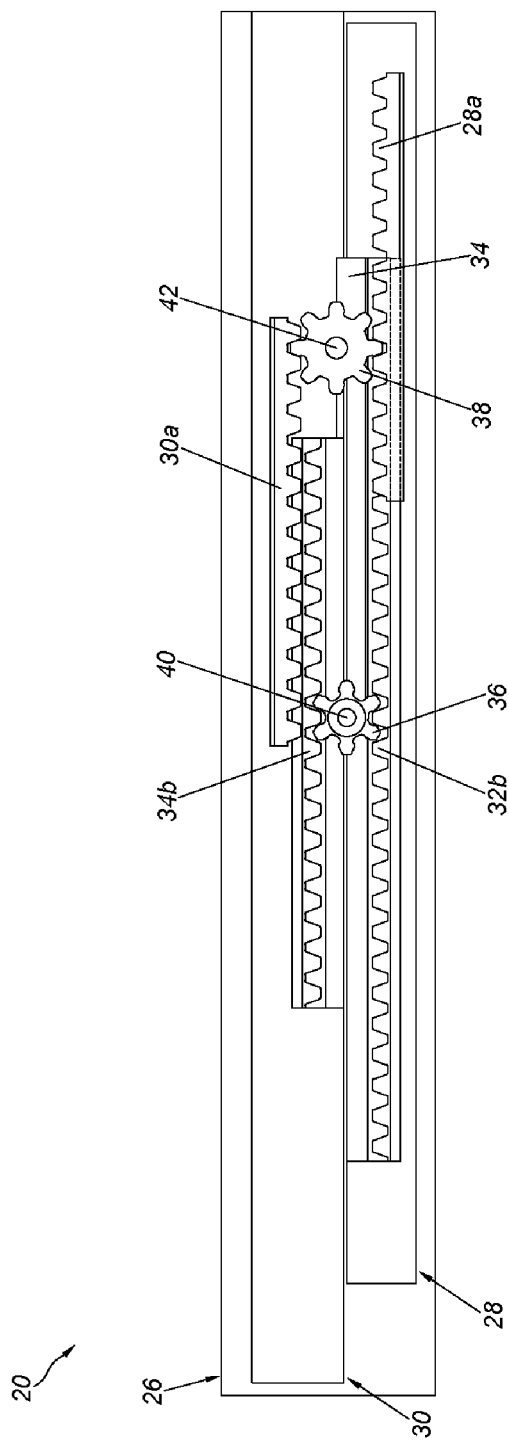
FIG. 8 is a diagram illustrating the slide rail assembly being in the retracted state according to the embodiment of the present invention.

As shown in FIG. 8, the slide rail assembly 20 in FIG. 8 is in the retracted state. Wherein, the first gear 36 is rotatable relative to the second rail 28 through a shaft 40. The second gear 38 is rotatable relative to the second sliding auxiliary device 34 through another shaft 42. In other words, the first gear 36 and the second gear 38 are rotatable through different shafts.

Figure 9:
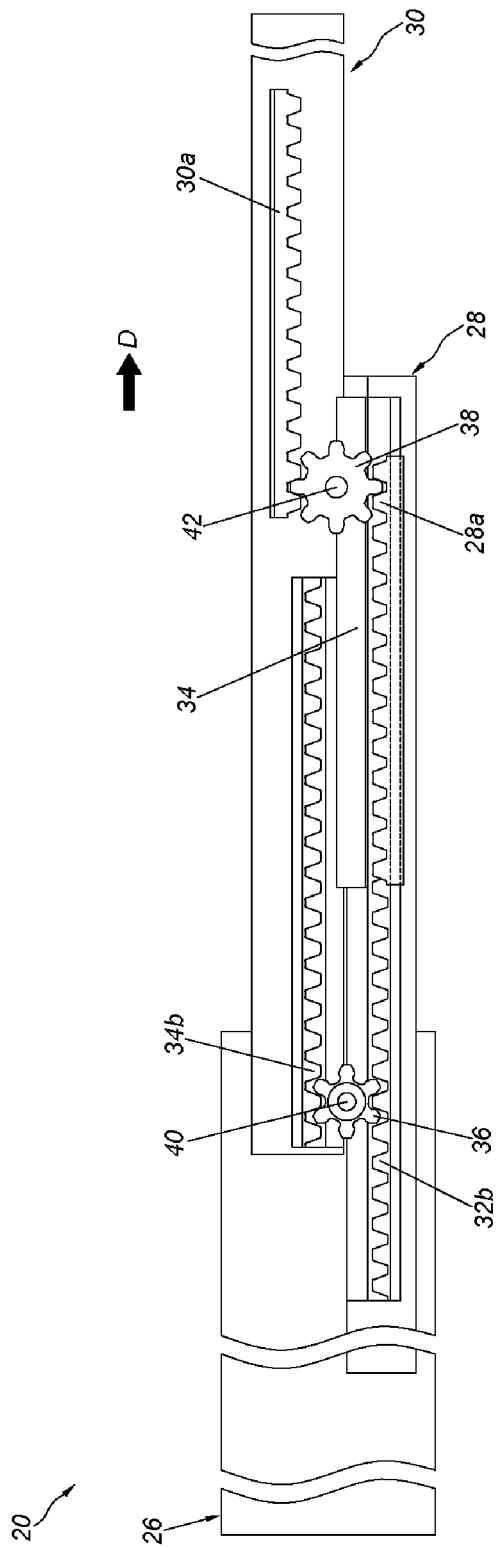
FIG. 9 is a diagram illustrating the slide rail assembly being in the extended state according to the embodiment of the present invention.

As shown in FIG. 9, when the third rail 30 is moved along an open direction D to be extended, the second gear 38 of the second sliding auxiliary device 34 meshes between the first function member 28a and the second function member 30a to improve the reliability and stability of movement of the second rail 28 and the third rail 30. Furthermore, the second rail 28 and the third rail 30 can be moved synchronously, in order to prevent the second rail 28 and the third rail 30 from erroneous movements. On the other hand, the first gear 36 of the second rail 28 meshes between the first function portion 32b and the second function portion 34b to improve the reliability and stability of movement of the first sliding auxiliary device 32 and the second sliding auxiliary device 34. Furthermore, the first sliding auxiliary device 32 and the second sliding auxiliary device 34 can be moved synchronously, in order to prevent the first sliding auxiliary device 32 and the second sliding auxiliary device 34 from erroneous movements.

Similarly, when the third rail 30 is moved along an opposite direction of the open direction D (such as a retracted direction) to be retracted, the second gear 38 meshes between the first function member 28a and the second function member 30a to prevent the second rail 28 and the third rail 30 from erroneous movements. On the other hand, the first gear 36 meshes between the first function portion 32b and the second function portion 34b to prevent the first sliding auxiliary device 32 and the second sliding auxiliary device 34 from erroneous movements.

According to the above arrangement, when the third rail 30 is retracted or extended, the present embodiment is able to prevent the second rail 28, the third rail 30, the first sliding auxiliary device 32 and the second sliding auxiliary device 34 from erroneous movements relative to each other. For example, delay movement or early movement of these components can be prevented.

Compared to the prior art, the slide rail assembly 20 of the present embodiment has advantages over the prior art by the following perspectives:

1. Through two gears 36, 38 with different shafts, the reliability and stability of movement of the two slide rails (such as the second rail 28 and the third rail 30) and the two sliding auxiliary devices (such as the first sliding auxiliary device 32 and the second sliding auxiliary device 34) is improved.

2. The first gear 36 and the second gear 38 are separated and have different shafts to be rotated respectively to meet some unique requirements of market. Wherein, the first gear 36 is arranged in the second rail 28, and the second gear 38 is arranged in the second sliding auxiliary device 34. The first gear 36 is able to be cooperated with the first function portion 32b of the first sliding auxiliary device 32 and the second function portion 34b of the second sliding auxiliary device 34. The second gear 38 is able to be cooperated with the first function member 28a of the second rail 28 and the second function member 30a of the third rail 30. According to the above arrangement, the second rail 28, the third rail 30, the first sliding auxiliary device 32 and the second sliding auxiliary device 34 are prevented from erroneous movements relative to each other.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A slide rail assembly, comprising:
   a first rail;
   a second rail movable relative to the first rail, the second rail having a first function member;
   a third rail movable relative to the second rail, the third rail having a second function member;
   a first sliding auxiliary device arranged between the first rail and the second rail, the first sliding auxiliary device having a first function portion;
   a second sliding auxiliary device arranged between the second rail and the third rail, the second sliding auxiliary device having a second function portion;
   a first gear arranged on the second rail, wherein the first gear is configured to mesh between the first function portion of the first sliding auxiliary device and the second function portion of the second sliding auxiliary; and
   a second gear arranged on the second sliding auxiliary device, wherein the second gear is configured to mesh between the first function member of the second rail and the second function member of the third rail;
   wherein the first gear is rotatable relative to the second rail through a shaft, and the second gear is rotatable relative to the second sliding auxiliary device through another shaft.

2. The slide rail assembly of claim 1, wherein the first sliding auxiliary device comprises a plurality of rolling members.

3. The slide rail assembly of claim 2, wherein the plurality of rolling members of the first sliding auxiliary device are rollers or balls.

4. The slide rail assembly of claim 1, wherein the second sliding auxiliary device comprises a plurality of rolling members.

5. The slide rail assembly of claim 4, wherein the plurality of rolling members of the second sliding auxiliary device are rollers or balls.

6. The slide rail assembly of claim 1, wherein the first function portion of the first sliding auxiliary device and the second function portion of the second sliding auxiliary device are racks.

7. The slide rail assembly of claim 1, wherein the first function member of the second rail and the second function member of the third rail are racks.

8. The slide rail assembly of claim 1, applicable to a furniture assembly comprising a first furniture member and a second furniture member, wherein the first rail is connected to the first furniture member and the third rail is configured to carry the second furniture member.

9. The slide rail assembly of claim 8, wherein the first furniture member is a cabinet body and the second furniture member is a drawer.

10. The slide rail assembly of claim 1, wherein the first gear accommodates in a first space of the second rail, and the second gear accommodates in a second space of the second sliding auxiliary device.

* * * * *